UNITED STATES PATENT OFFICE.

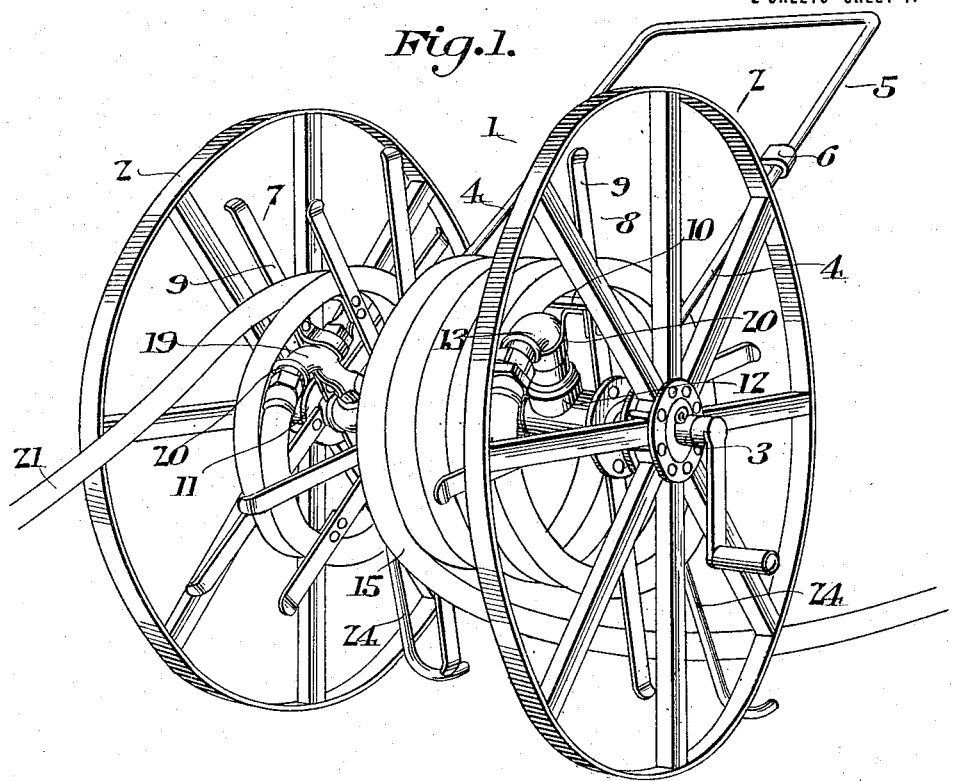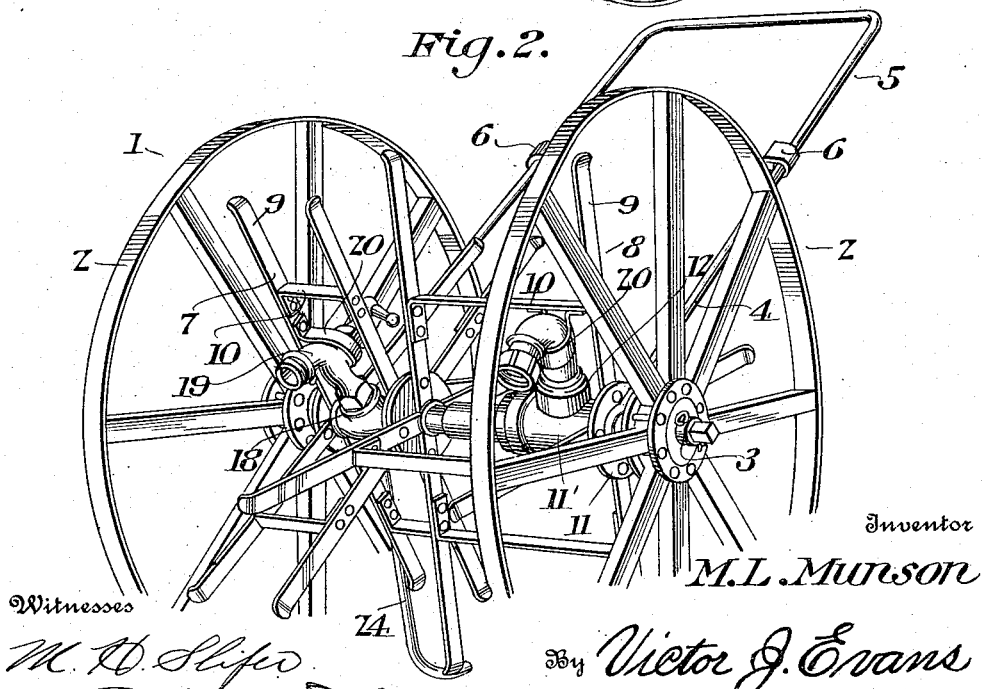

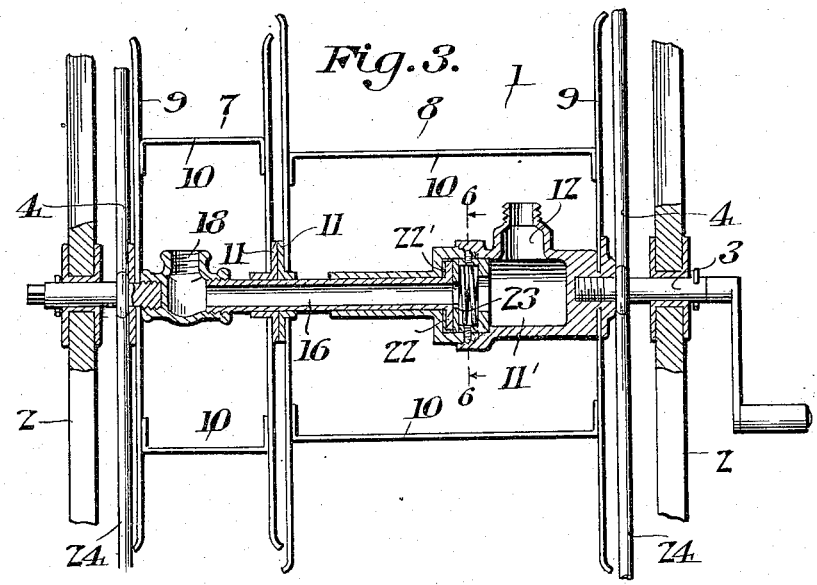
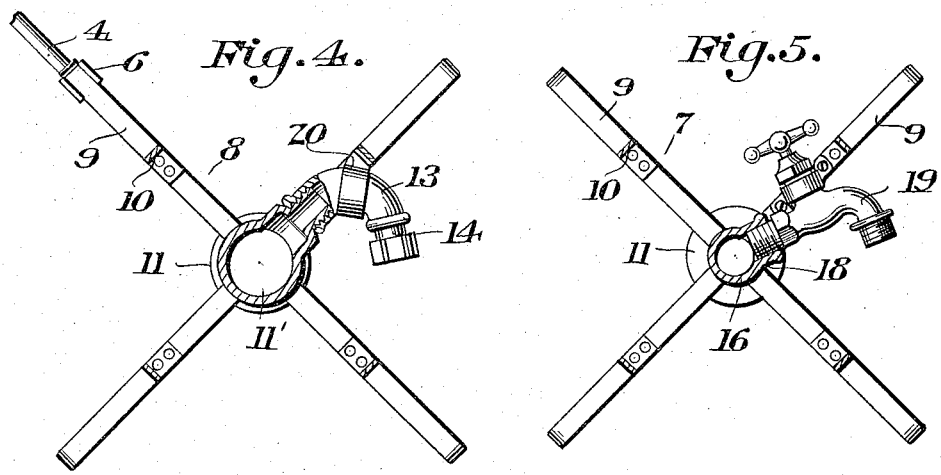
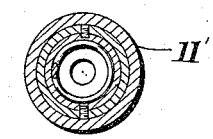

MELVIN L. MUNSON, OF SCHENECTADY, NEW YORK.

HOSE-REEL.

1,165,277. Specification of Letters Patent. Patented Dec. 21, 1915.

Application filed March 5, 1915. Serial No. 12,396.

*To all whom it may concern:*

Be it known that I, MELVIN L. MUNSON, a citizen of the United States, residing at Schenectady, in the county of Schenectady and State of New York, have invented new and useful Improvements in Hose-Reels, of which the following is a specification.

The present invention relates to improvements in reels for air, steam, water hose, etc. In carrying out my invention it is my purpose to provide two or more reels supported upon a wheeled truck; to arrange each of said reels so that the same may be revolved independently upon the truck; to provide a truck with stop members or lugs whereby the same cannot be rotated except by a direct pressure upon the truck; the said reels being of different widths, so that hose of different lengths may be arranged thereon.

A further object of the invention is to provide a truck with reels of different sizes, or of varying hose carrying capacities and to arrange upon the axle of the truck a pipe connection for the hose, whereby the hose members may have their ends connected and further whereby a hose of a comparatively great length may be arranged upon the truck and the several elements of the hose connected so that a fluid may readily pass through all of the hose sections.

With the above and other objects in view, the improvement resides in the construction, combination and arrangement of parts set forth in the following specification and falling within the scope of the appended claims.

In the drawings: Figure 1 is a perspective view of a hose reel constructed in accordance with the present invention, Fig. 2 is a similar view with the hose detached from the reel, Fig. 3 is a central longitudinal sectional view taken through the axle and the connecting members for the hose, Fig. 4 is a transverse sectional view approximately on the line 4—4 of Fig. 3, Fig. 5 is a similar sectional view on the line 5—5 of Fig. 2, Fig. 6 is a transverse sectional view on the line 6—6 of Fig. 3.

Referring now to the drawings in detail, the numeral 1 designates my device in its entirety. The device includes a truck comprising a pair of wheels 2—2 connected by an axle 3, the said axle, adjacent the inner hubs of the wheels having arranged thereon the arms 4—4 of a substantially U-shaped handle or propelling member 5. The arms 4—4 are preferably circular in cross section, and each of the said arms has arranged thereon a slidable clip 6, the purpose for which will presently be described. Arranged upon the axle 3 is a pair of reels 7 and 8 respectively, each of said reels including spaced sides comprising arms 9—9 which are connected through the medium of transverse bars 10—10. The reels are disposed inwardly of the connection between the handle 5 and the hubs of the wheels 2 and the central or connecting member between the arms 9—9 of said reels 7 and 8 are provided with disks 11 to which the arms 9—9 are secured. Arranged upon the shaft 3 and disposed between the arms 9—9 of the reel 8 is a pipe member 11′, the same being disposed to surround the shaft 3 and is provided with an angular or offset extension 12, the said extensions having connected thereto a U-bend 13 provided with a nipple 14 whereby a hose 15 is connected with the said hollow pipe member. The pipe member 11′ receives a smaller pipe member 16 which is arranged upon the shaft 3 between the arms of the reel member 7, the said pipe 16 being formed with an angular offset portion 17 having a threaded extension 18 and a regulating cock 19. The members 13 and 17 are secured between the arms or between the connecting members 10 of the arms 9 of the reels 7 and 8 through the medium of suitable clips 20. The cock 19 has its delivery end threaded to receive the threaded end of the shorter hose member 21 which is wound upon the reel 7. The open end of the pipe 11′ is provided with an annular interiorly threaded mouth or flange *a* and received within the said open end and secured therein in any or preferred manner, is a flanged wing *b*. The pipe 16 has one of its ends formed with an annular flange *c* which is received in the mouth of the pipe section 11′ and which contacts with the outer edge of the ring *b*.

The character *d* designates a sleeve which is arranged upon and surrounds the major portion of the pipe 16 that is disposed between the arms of the reel 8, the said sleeve *d* having one of its ends flanged, as at 22, provided with an annular extension *e* which is formed with exterior threads adapted to co-engage with interior threads upon the enlarged mouth or end $a$ of the pipe section 11′. A compressible washer 22′ is disposed between the flanged end $c$ of the sleeve $d$, while a helical spring 23 is arranged within the flanged ring $b$ and exerts a tension between the flange of the said ring and the flange $c$ of the pipe 16′. By this arrangement it will be noted that either of the reels may be freely rotated one independent of the other.

The clips 6 are adapted to engage with the arms 9 of either of the reel members 7 or 8 to sustain the same against rotation and arranged upon the shaft 3, and preferably connected with the side members 4 of the handle 5 are feet members 24, the lower ends of the same being curved so that the wheel truck will be prevented from rotation when the said feet contact with the ground.

In the operation of the device, the hose 15 which is connected with the member 13 is unwound from the reel 8 and secured to a suitable hydrant or the like. Thereafter the reel 7 is unwound and the hose 21 thereon reeled off of the same so that a nozzle upon the hose 21 may be properly positioned. Thereafter, the fluid from the faucet may be forced to within the hose 15 and the cock or valve 19 opened to permit of the fluid passing through the pipe members and through the hose 21.

Either of the hose sections 15 or 21 may be readily wound upon its respective reel, as will be understood, and when it is desired to dry either of the hose sections, the same may be disconnected from the nipple of the threaded member 18 to permit of the water or fluid dripping therefrom, after which the said hose sections may be replaced and wound upon their respective reels.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a hose reel, a wheeled support, a plurality of reels having communicating hollow shafts journaled upon the support, and rotatable one independent of the other, hose members wound upon the reels, and said hose members being connected to communicate with the respective hollow shafts.

2. In a hose reel, a wheeled supporting carriage, a substantially U-shaped handle, a plurality of reels having communicating hollow shafts journaled upon the supporting carriage, and rotatable one independent of the other, hose members wound upon the respective reels and connected to communicate with the respective hollow shafts, and supporting feet for the carriage.

3. In a hose reel, a wheeled support, a handle for the support, a movable clip upon the handle, supporting feet for the carriage adapted to be engaged by the clip when the carriage is propelled to lock the feet to the handle, a plurality of communicating pipe members between the wheels of the support connected with the axles for the wheels, a reel connected with each of the pipe members, each of said reels including spaced arms and transverse bars connecting the arms, a hose wound upon each of the reels, said hose members being connected to communicate with the respective pipe members, the connection between one of said hose members and the corresponding pipe member including a regulating cock, means including a handle connected to either of the axles for rotating one of the pipe sections independent of the other section, and the clip of the handle adapted to engage with the arms of one of the reels to sustain the same against rotation.

In testimony whereof I affix my signature in presence of two witnesses.

MELVIN L. MUNSON.

Witnesses:
Wm. A. Lindsey,
Walter A. Trombley.

Copies of this patent may be obtained for five cents each, by addressing the "Commissioner of Patents, Washington, D. C."